United States Patent [19]

Horn et al.

[11] B 4,014,849

[45] Mar. 29, 1977

[54] SELF-EXTINGUISHING REINFORCED POLYCARBONATE MOLDING COMPOSITIONS

[75] Inventors: Peter Horn, Ludwigshafen; Cai von Rumohr, Frankenthal, both of Germany

[73] Assignee: BASF Aktiengesellschaft, Ludwigshafen (Rhine), Germany

[22] Filed: Nov. 4, 1974

[21] Appl. No.: 520,878

[44] Published under the second Trial Voluntary Protest Program on April 6, 1976 as document No. B 520,878.

[30] Foreign Application Priority Data

Nov. 5, 1973 Germany .......................... 2355211

[52] U.S. Cl. ...................... 260/37 PC; 106/15 FP; 260/45.7 P
[51] Int. Cl.[2] ........................................ C08L 69/00
[58] Field of Search .................. 260/37 PC, 45.7 P; 106/15 FP

[56] References Cited

UNITED STATES PATENTS

| | | | |
|---|---|---|---|
| 3,477,982 | 11/1969 | Dijkstra et al. | 260/45.7 P X |
| 3,671,487 | 6/1972 | Abolins | 260/40 R |
| 3,808,127 | 4/1974 | Sander et al. | 260/45.7 P X |
| 3,817,907 | 6/1974 | Muller et al. | 260/37 PC |

*Primary Examiner*—Lewis T. Jacobs
*Attorney, Agent, or Firm*—Johnston, Keil, Thompson & Shurtleff

[57] ABSTRACT

Self-extinguishing reinforced molding compositions based on aromatic polycarbonates and containing from 0.5 to 15% by weight, based on the weight of polycarbonate, of red phosphorus and a reinforcing agent such as glass fibers or glass spheres or a filler such as asbestos. The molding compositions are suitable for processing to shaped articles.

7 Claims, No Drawings

SELF-EXTINGUISHING REINFORCED POLYCARBONATE MOLDING COMPOSITIONS

This invention relates to the flame-proofing of reinforced polycarbonate molding compositions with red phosphorus.

Polycarbonates based on aromatic dihydroxy compounds and phosgene and/or bischlorocarboxylates, such as are described for example in German Patent 1,300,266, show a better flame resistance than other thermoplastic molding compositions such as polyamides, polyoxymethylene and polyesters. However, this improved fire resistance is inadequate for numerous applications in which polycarbonates are suitable on account of their mechanical properties. This is particularly the case when the polycarbonates contain chemically inert reinforcing agents or mineral fillers such as glass fibers, carbon fibers, glass spheres, asbestos, kaolin, aerosil and chalk.

It is an object of the invention to provide self-extinguishing molding compositions based on aromatic polycarbonates and containing reinforcing agents or fillers without the good processing properties of the polycarbonate and the mechanical properties of shaped articles made therefrom being impaired. By "self-extinguishing" we mean that the test specimens cease burning or show no spread of flame when the flame is removed and that the flame caused by a second ignition extinguishes within a specified period of time.

We have found, surprisingly, that this object is achieved in a molding composition based on aromatic polycarbonates and containing, according to the invention, from 0.5 to 15% by weight, based on the polycarbonate, of red phosphorus together with a reinforced agent or an inert filler.

It may be noted that in the prior art it is well known that red phosgene has a flame-protecting effect when added to foamed plastics (German Patent 1,173,641), to casting resins (U.S. Pat. No. 3,373,135, UK Patent 1,112,139) and to some thermoplastics (UK Patents 1,157,419 and 1,147,009 and German Published Application 1,931,387). Since aromatic polycarbonates differ fundamentally, inter alia, in their mechanical properties, their degree of crystallization, their melting behavior and their processability when molten, from other thermoplastics, it has not been surprising to find that polycarbonates cannot be rendered self-extinguishing by the use of equal or larger amounts of red phosphorus. It is thus very surprising that aromatic polycarbonates containing fillers or reinforcing agents become self-extinguishing when the molding compositions have a specific content of red phosphorus.

Commercial-grade red phosphorus may be used, this containing, if desired, stabilizing additives comprising metal oxides and metal salts in amounts of up to 3% by weight. The red phosphorus may be incorporated, for example, in a pure form or as a mixture with the filler or reinforcing agent or by way of a masterbatch such as is described, for example, in "Kunststoffe" 49, pp. 543–546 (1959). The masterbatches may be prepared using dispersing or passivating agents which are thermally stable up to 320°C, are miscible with the polycarbonate and are inert to the carbonate melt. Furthermore, the dispersing agent, after incorporation of the red phosphorus, should be readily removable from the polycarbonate melt, for example by vacuum distillation. It is also advantageous to use a dispersing agent which is solid at room temperature and has a passivating effect on the red phosphorus so as to avoid fires which could be caused, for example, by electrostatic charges occurring during blending of the polycarbonate with the red phosphorus at room temperature or during incorporation of the red phosphorus into the melt.

The red phosphorus is added to the aromatic polycarbonate in an amount such that the molding compositions contain from 0.5 to 15% and preferably from 1 to 8% and more preferably from 2 to 6% of red phosphorus, by weight of the polycarbonate.

In addition to red phosphorus, the self-extinguishing reinforced polycarbonate molding compositions of the invention contain reinforcing agents or fillers, usually in amounts of from 5 to 50% and preferably from 15 to 35%, by weight of the polycarbonate. Examples of suitable fillers are mineral substances such as chalk, kaolin and aerosil and preferably asbestos. However, we prefer to use reinforcing agents such as glass fibers, particularly glass fibers having a length of from 0.1 to 1 mm and a diameter of from 0.01 to 0.02 mm, and glass spheres having a diameter of from 5 to 50 $\mu$m, on average. The glass fibers may be used in the form of chopped strands having a length of 6 mm or preferably in the form of endless rovings.

The aromatic polycarbonates are prepared by known methods, for example by interfacial polycondensation according to German Patent 1,300,266 or by transesterification of diphenyl carbonate with aromatic dihydroxy compounds according to German Published Application 1,495,730. The aromatic polycarbonates used in the preparation of the molding compositions of the invention usually have K values of from approx. 48 to 55 (measured on a 0.5% solution in methylene chloride at 25°C by the method proposed by H. Fikentscher in Cellulosechemie 13, p. 58 (1932)).

Incorporation of the red phosphorus or phosphorus containing mixture is effected by the usual methods for blending solid components with thermoplastics, for example by means of a single-screw or twin-screw extruder, an injection molding machine, a roller mixer, a ribbon blender or a twinshaft kneader. The reinforcing agents or fillers may be added to the polycarbonate separately or together with the red phosphorus.

When use is made of a masterbatch or a slurry of red phosphorus in a precondensate of diphenyl carbonate and 2,2-[4,4'-dihydroxydiphenyl]propane according to German Published Application 1,495,730 it is advantageous to provide the mixer, such as the extruder, ribbon blender or twin-shaft kneader, with devolatilizing means so that the volatiles may be removed through a port mounted on a portion of the housing at which the mixture passing therethrough is molten.

In the self-extinguishing reinforced polycarbonate molding compositions the red phosphorus is present in the form of a uniformly distributed heterogeneous phase. The average size of the phosphorus particles should be between 0.001 and 0.5 mm and preferably between 0.01 and 0.15 mm in diameter.

In addition to the additives of the invention, the self-extinguishing reinforced polycarbonate molding compostions may contain further additives such as dyes, pigments, stabilizers counteracting thermal, thermooxidative and ultraviolet attack, antistatic compounds and processing auxiliaries ensuring trouble-free extrusion and injection molding, provided such additives do not impair the flame resistance.

The molding compositions of the invention are suitable, for example, for the manufacture of supports for electrical parts and of shaped articles used in the electrical industry, for example cover plates and coil formers.

The fire-resistant properties were tested on rod-shaped injection moldings having a length of 12.7 cm, a width of 1.27 cm and a thickness of 0.16 cm, by a method similar to that described in "Self-extinguishing test" in Modern Plastics, October 1970, pp. 92 to 98, particularly pp. 95–96.

EXAMPLE 1

A granular polycarbonate based on phosgene and 2,2-[4,4'-dihydroxydiphenyl]propane and having a relative viscosity of 1.305 (measured on a 0.5% solution in methylene chloride at 25°C) was thoroughly mixed with red phosphorus and glass fibers in a tumbling drum, melting and homogenized in an extruder and extruded in the form of a rope which was then granulated on cooling.

Specimens having a length of 12.7 cm, a width of 1.27 cm and a thickness of 0.16 cm were made from the dry granules and subjected to the self-extinguishing test. This test was repeated after storage of the test specimens for 7 days at 70°C and 4 hours at 23°C over calcium chloride as desiccant.

COMPARATIVE EXAMPLES A TO D

Test specimens were made as described in Example 1 except that the addition of glass fibers and/or red phosphorus was omitted.

The composition of the polycarbonate molding compositions and the results of the self-extinguishing test are listed in the Table below.

The Examples show that only the reinforced polycarbonate molding compositions of the invention give specimens having a fire resistance which can be classified as SE O.

TABLE

| Ex. | Specimen | red phosph. (% w/w) | glass fibers (% w/w) | Results of self-extinguishing test | | | | | |
|-----|----------|---------------------|----------------------|---|---|---|---|---|---|
| | | | | immediately after manufacture of specimens | | | after storage for 7 days at 70°C and 4 hours at 23°C | | |
| | | | | classification (SE) | burning time (sec.) | dripping observed | classification (SE) | burning time (sec.) | dripping observed |
| A | polycarbonate | — | — | 2 | 7.0 | yes | 2 | 5.4 | yes |
| B | polycarbonate | 5 | — | 2 | 0.8 | yes | 2 | 0.7 | yes |
| C | polycarbonate | — | 10 | 2 | 7.7 | yes | 2 | 6.1 | yes |
| D | polycarbonate | — | 30 | 1–2 | 4.6 | yes | 2 | 3.8 | yes |
| 1 | polycarbonate | 5 | 30 | 0 | 1.0 | no | 0 | 1.1 | no |

The percentages are by weight of the polycarbonate.
The burning time is the total burning time following two ignition periods each of 10 seconds' duration.

We claim:
1. Self-extinguishing reinforced organic polycarbonate molding compositions comprising:
   a. an organic polycarbonate;
   b. from 0.5 to 15% by weight of particulate red phosphorus based on the weight of the polycarbonate, said red phosphorus having an average particle diameter of from 0.001 to 0.5 mm; and
   c. from 5 to 50% by weight of a reinforcing agent based on the weight of the polycarbonate.
2. Self-extinguishing compositions as set forth in claim 1 wherein said red phosphorus has a particle diameter of from 0.01 to 0.15 mm.
3. Self-extinguishing reinforced molding compositions as set forth in claim 1, wherein the reinforcing agent comprises glass fibers.
4. Self-extinguishing reinforced molding compositions as set forth in claim 1, wherein the reinforcing agent comprises glass spheres having an average diameter of from 5 to 50 μm.
5. Self-extinguishing reinforced molding compositions as set forth in claim 1 and containing from 15 to 35% by weight of at least one reinforcing agent.
6. Self-extinguishing reinforced molding compositions as set forth in claim 3, wherein the glass fibers in the molding composition have a length of from 0.1 to 1 mm and a diameter of from 0.01 to 0.02 mm.
7. Self-extinguishing reinforced molding compositions as set forth in claim 1, wherein the aromatic polycarbonate is a polycarbonate based on aromatic dihydroxy compounds and phosgene, the phosgene being completely or partially replaced by bischlorocarboxylates.

* * * * *